United States Patent
Ribeiro

(10) Patent No.: US 9,289,743 B2
(45) Date of Patent: Mar. 22, 2016

(54) SYSTEM FOR THE RADIATION TREATMENT OF SUBSTRATES

(71) Applicant: Oerlikon Surface Solutions AG, Trübbach, Trübbach (CH)

(72) Inventor: Carlos Ribeiro, Ho Chi Minh (VN)

(73) Assignee: Oerlikon Surface Solutions AG, Trübbach, Trübbach (CH)

( * ) Notice: Subject to any disclaimer, the term of this patent is extended or adjusted under 35 U.S.C. 154(b) by 0 days.

(21) Appl. No.: 14/424,604

(22) PCT Filed: Jul. 26, 2013

(86) PCT No.: PCT/EP2013/002228
§ 371 (c)(1),
(2) Date: Feb. 27, 2015

(87) PCT Pub. No.: WO2014/032754
PCT Pub. Date: Mar. 6, 2014

(65) Prior Publication Data
US 2015/0202587 A1    Jul. 23, 2015

(30) Foreign Application Priority Data
Aug. 31, 2012  (DE) .................. 10 2012 017 230

(51) Int. Cl.
| | | |
|---|---|---|
| G21K 5/00 | (2006.01) |
| B01J 19/12 | (2006.01) |
| B29C 35/08 | (2006.01) |
| B05D 3/06 | (2006.01) |
| F26B 3/30 | (2006.01) |
| B29C 71/04 | (2006.01) |
| B29C 37/00 | (2006.01) |

(52) U.S. Cl.
CPC ................. *B01J 19/12* (2013.01); *B05D 3/067* (2013.01); *B29C 35/0805* (2013.01); *F26B 3/30* (2013.01); *B29C 37/0092* (2013.01); *B29C 71/04* (2013.01); *B29C 2035/0822* (2013.01); *B29C 2035/0827* (2013.01)

(58) Field of Classification Search
USPC ................................ 250/492.1, 492.2, 492.3
See application file for complete search history.

(56) References Cited

U.S. PATENT DOCUMENTS

| | | |
|---|---|---|
| 4,336,279 A | 6/1982 | Metzger |
| 6,072,158 A | 6/2000 | McNally |
| 2011/0300497 A1 | 12/2011 | Derrien |

FOREIGN PATENT DOCUMENTS

| | | |
|---|---|---|
| DE | 1953074 | 10/1970 |
| DE | 3305173 A1 | 8/1984 |
| DE | 19916474 A1 | 10/2000 |
| DE | 102004023537 B4 | 12/2007 |
| JP | 57137133 A | 8/1982 |

*Primary Examiner* — Nicole Ippolito
*Assistant Examiner* — Hanway Chang

(57) ABSTRACT

A system for the radiation treatment of substrates, which comprises, in a chamber above the substrate holders for fitting substrates to be treated, at least one radiation source, and wherein the chamber comprises means for maintaining a gas flow in the chamber with at least one gas inlet and at least one gas outlet, characterized in that the at least one gas inlet is disposed in the region of the substrate holders in such a way that gas flowing in through the at least one gas inlet first flows around the substrate holders prior to leaving the chamber again, either directly and/or after flowing around the at least one radiation source, through the gas outlet.

5 Claims, 2 Drawing Sheets

SYSTEM FOR THE RADIATION TREATMENT OF SUBSTRATES

FIELD OF THE INVENTION

The present invention relates to a system for irradiating a substrate with electromagnetic radiation, such as infrared radiation (IR radiation) for the drying of substrates and/or ultraviolet radiation (UV radiation) for curing UV hardening paints, for example.

BACKGROUND OF THE INVENTION

Such systems are used, for example, as a component of painting systems. In such painting systems, the substrate surface is typically cleaned in a first step. This may be done, for example, using air pressure and/or agents for ionizing the surface, or by spraying the surface with a liquid medium, such as water or an aqueous or alcoholic or solvent-containing solution, or with a solid body, such as blasting material or CO2, or by immersing the substrates in an aqueous or alcoholic or solvent-containing solution, possibly under the influence of waves, such as ultrasound or microwaves.

When cleaning with liquid media, IR heat radiation may already be used for the following drying process.

In a second step, the actual paint layer is then applied, for example by spraying on a paint dispersion. A step follows in which the already painted substrate is baked. This can be done by means of heating with circulating air and/or by the application of infrared radiation (IR) at 50-80° C., for example. In the process, the solvent commonly present in the paint dispersion is substantially evaporated. In the case of a UV hardening paint, which is very widespread today, i.e. a paint that is cured by means of UV light, this hardening takes place in a step following the evaporation of the solvent. Depending on the application, IR and/or UV lamps are used in these process steps. In the present description, the process of drying by means of IR radiation and/or the process of curing by means of UV radiation is uniformly referred to as radiation treatment.

In order to prevent the unimpeded volatilization of the solvents into the environment or the working environment, such processes, according to the prior art, are carried out in treatment chambers. In the process, it should be ensured that a constant gas exchange takes place in order to keep the solvent concentration in the substrate environment low, for example, and to thus also accelerate the drying and/or curing process. According to the prior art, the radiation treatment is carried out in a closed chamber 1, as is schematically shown in FIG. 1. In this case, the radiation source 9, 9', 9" is provided in the upper part of the chamber 1 and the substrate holders 11, 11' to be fitted with the substrates are placed in the lower part. FIG. 1 shows as substrate holders two spindles that can be fitted with components to be irradiated. The placement of the radiation sources 9, 9', 9" underneath the substrate holders 11, 11' would also be possible, but is generally avoided in order not to risk the radiation sources 9, 9', 9" being soiled by paint residues dripping down from the substrates.

According to the prior art, an inflow region 7 is provided on the chamber ceiling, through which, supplied by an inlet 3, gas such as air, for example, flows into the chamber. According to the prior art, the gas flows past the radiation sources 9, 9', 9" and then the substrates 11, 11' into the lower region of the chamber, where it is withdrawn from the chamber 1 via the outlet 5. Due to this arrangement in accordance with the prior art, the flow and gravitation cooperate in such a way that dirt, such as dust and also solvent, for example, are withdrawn effectively. In FIG. 1 the gas flow and the direction thereof is schematically illustrated by means of arrows.

However, the arrangement according to the prior art is disadvantageous in that the gas flow flowing past the substrates first has to pass the radiation sources. Generally, they are hot in operation, which results in the gas flow being heated up in an uncontrolled manner. This means that a gas flow is applied to the substrate holders 11, 11' which has no defined temperature and in which temperature gradient may even arise across the width of the substrate holders. However, the process of drying and/or curing is heavily influenced by the prevailing temperature. Therefore, undefined temperature conditions quickly result in an uncontrolled process. Inhomogeneities may arise particularly if there are temperature gradients. The issue is exacerbated by the radiation sources themselves generally not being stabilized with regard to temperature. In the initial phase, the radiation sources will be rather cool, whereas they heat up significantly after a longer operating period. This problem could be reduced by explicit cooling measures on the radiation sources. However, such measures entail considerable technical effort and are thus expensive.

That said, it would be desirable to have a system for radiation treatment available with which the above-described issues of the prior art are ameliorated and preferably overcome entirely.

Therefore, the invention is based on the object of providing such a system.

SUMMARY OF THE INVENTION

According to the invention, the issues described above are solved in principle by a gas flow being built up in the chamber which flows past the substrates immediately subsequent to entering the chamber. Since the gas flow does not previously flow past the radiation sources, which may possibly emit heat, the temperature of the gas flow is well-defined and can easily be set to a desired stable value.

BRIEF DESCRIPTION OF THE DRAWINGS

The invention and its advantageous embodiments are now described by way of example with reference to Figures.

DETAILED DESCRIPTION OF THE PREFERRED EMBODIMENTS

Figure 1:
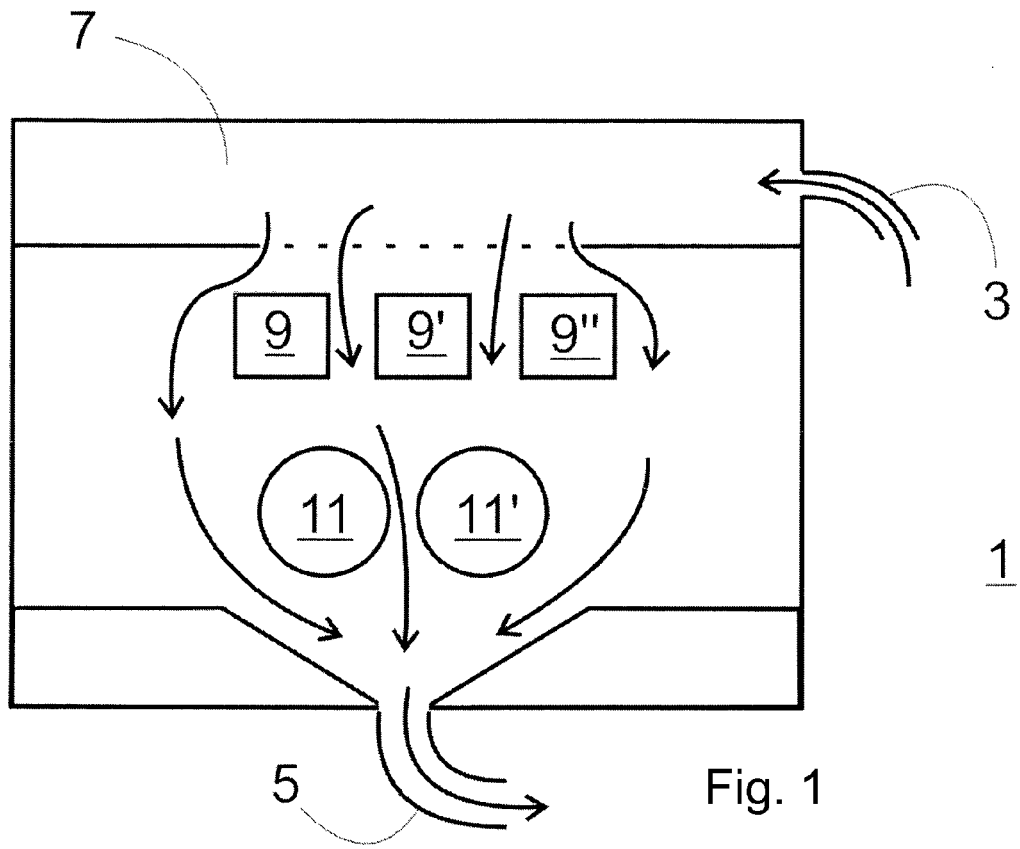
FIG. 1 shows a system for the radiation treatment of substrates according to the prior art.
Figure 2:
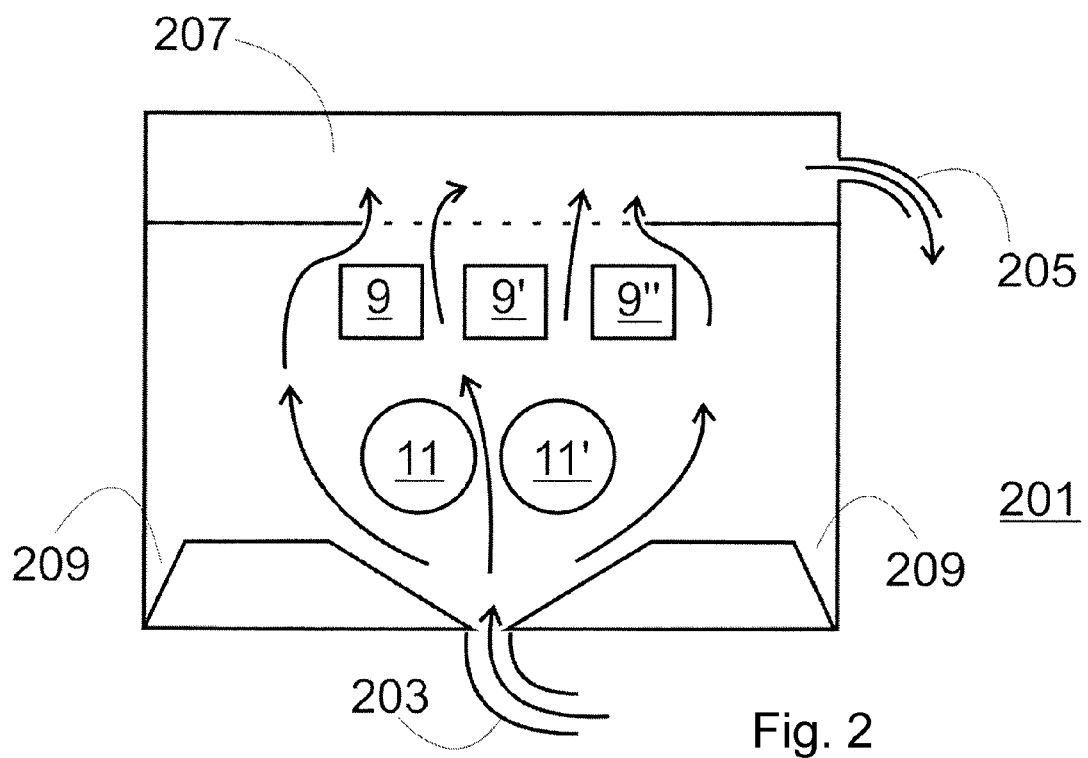
FIG. 2 shows a system according to the invention for the radiation treatment of substrates according to a first embodiment.

FIG. 2 shows an inventive system according to a first embodiment. A chamber 201 is depicted in which radiation sources 9, 9', 9" and substrates 11, 11' to be irradiated are disposed. A gas inlet 203 is provided at the bottom of the chamber, in the vicinity of the substrates 11, 11'. According to this embodiment, the gas outlet 205, upstream of which a ceiling chamber 207 may be disposed, is provided in the region of the chamber ceiling. During the operation of the system, the gas, after entering the chamber, first flows past the substrates 11, 11' before flowing around the radiation sources 9, 9', 9" and flowing through the optional ceiling chamber 207 out via the gas outlet 205. In this way, the temperature of the gas flowing past the substrates 11, 11' is well-defined, and the process can take place under precisely predetermined and stable temperature conditions. It is advantageous to provide, at the edge regions of the chamber, indentations 209 which can act as dust collectors.

Figure 3:
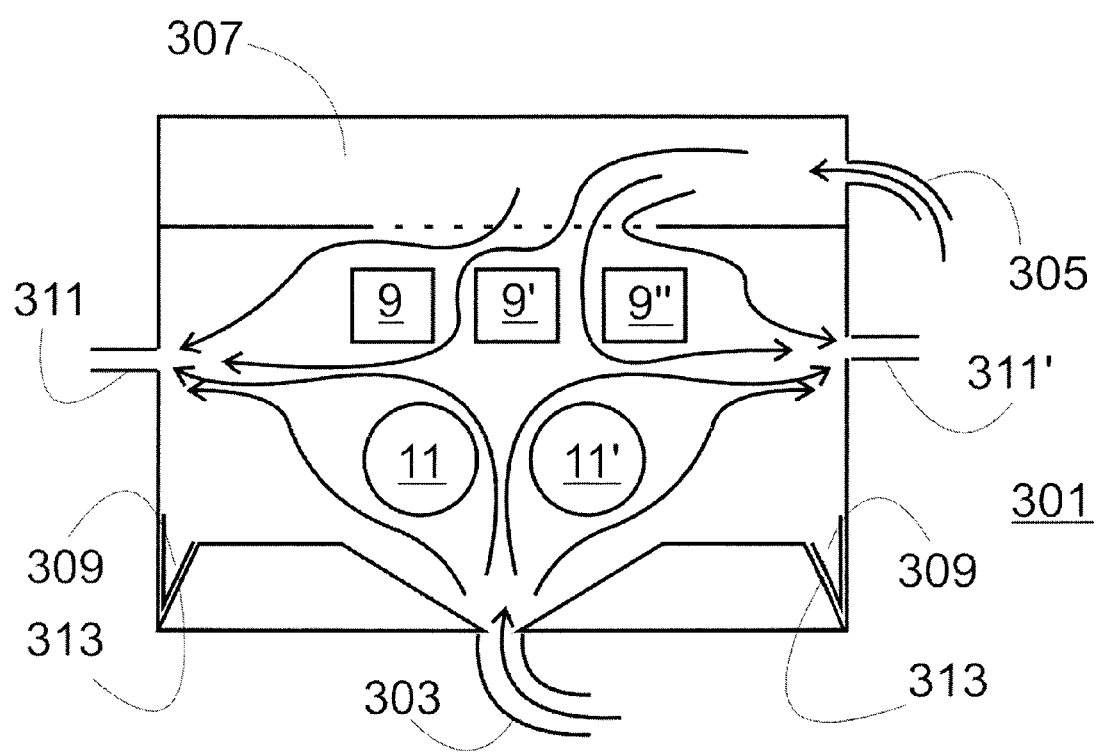
FIG. 3 shows a system according to the invention for the radiation treatment of substrates according to a second embodiment.

A second advantageous embodiment of the present invention is shown in FIG. 3. In this case, gas flows are applied to a chamber 301 with radiation sources 9, 9', 9", which are disposed above substrates 11, 11', both through a first inlet 303 in the lower region of the chamber underneath the substrates 11, 11', and through a second inlet 305 in the upper region of the chamber above the radiation sources 9, 9', 9". Outlets 311, 311', which are preferably arranged symmetrically, are preferably provided at half the height of the chamber. In this embodiment, the two gas flows, as is indicated in this Figure by means of arrows, meet approximately at half height, i.e. between the radiation sources 9, 9', 9" and the substrates 11, 11' and escape from the inside of the chamber via the laterally disposed outlets 311, 311'. This particularly preferred embodiment of the present invention is advantageous, in particular, in that dust particles transported with the gas flow tend to be transported towards the edge of the chamber. If, in addition, indentations 309 are also provided there that can act as dust collectors, then dust which may possibly be present in the chamber, and which is mainly transported towards the outlets 311, 311' but leaves the gas flow on the way, is mainly collected in the dust collectors. According to a particularly preferred embodiment, a removable container 313 is provided in each of the indentations 309, so that the dust collects in this container and can be easily disposed of by removing and emptying the container. Of course, such a container can also be used in an advantageous manner in the other embodiments of the present invention.

In the present case, a system for the radiation treatment of substrates was disclosed, which comprises, in a chamber above the substrate holders for fitting substrates to be treated, at least one radiation source, and the chamber comprises means for maintaining a gas flow in the chamber with at least one gas inlet and at least one gas outlet, characterized in that the at least one gas inlet is disposed in the region of the substrate holders in such a way that gas flowing in through the at least one gas inlet first flows around the substrate holders prior to leaving the chamber again, either directly and/or after flowing around the at least one radiation source, through the gas outlet.

In the system, the gas outlet can be provided in the region of the at least one radiation source in such a way that the gas, subsequent to flowing around the substrate holders, flows around the at least one radiation source before leaving the chamber via the gas outlet.

The gas outlet can be provided at a level between the substrate holder and at least one radiation source.

A second gas inlet can be provided in the region of the at least one radiation source in such a way that gas flowing in through the second gas inlet first flows around the at least one radiation source prior to encountering the gas that flows from the substrate holders and flowing out of the chamber together with it.

Indentations can be provided at the lower edge of the chamber in such a way that the flow is reduced in the region of the indentations and, accordingly, the indentations act as dust collectors.

Removable containers can be provided in the indentations.

The invention claimed is:

1. A system for the radiation treatment of substrates, comprising:
    a chamber above at least one substrate holder for fitting substrates to be treated; and
    at least one radiation source in the chamber, wherein the chamber maintains a gas flow in the chamber with at least one gas inlet and at least one gas outlet, with the at least one gas inlet disposed in a region of the substrate holders in such a way that gas flowing in through the at least one gas inlet first flows around the substrate holders prior to leaving the chamber again, either directly and/or after flowing around the at least one radiation source, through the at least one gas outlet, and indentations are provided at a lower edge of the chamber in such a way that the flow is reduced in a region of the indentations and, accordingly, the indentations act as dust collectors.

2. The system according to claim 1, wherein the at least one gas outlet is provided in a region of the at least one radiation source in such a way that the gas, subsequent to flowing around the substrate holders, flows around the at least one radiation source before leaving the chamber via the at least one gas outlet.

3. The system according to claim 1, wherein the at least one gas outlet is provided at a level between the at least one substrate holder and the at least one radiation source.

4. The system according to claim 3, further comprising a second gas inlet in a region of the at least one radiation source in such that gas flowing in through the second gas inlet first flows around the at least one radiation source prior to encountering gas that flows from the substrate holders, and the gas flowing in through the second gas inlet flows out of the chamber together with the gas that flows from the substrate holders.

5. The system according to claim 1, further comprising removable containers ae provided, at least partially, in the indentations.

\* \* \* \* \*